United States Patent
Yang

(10) Patent No.: US 10,805,848 B2
(45) Date of Patent: Oct. 13, 2020

(54) INFORMATION TRANSMISSION METHOD, NETWORK DEVICE AND TERMINAL DEVICE

(71) Applicant: GUANGDONG OPPO MOBILE TELECOMMUNICATIONS CORP., LTD., Dongguan, Guangdong (CN)

(72) Inventor: Ning Yang, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/473,170

(22) PCT Filed: Dec. 30, 2016

(86) PCT No.: PCT/CN2016/113684
§ 371 (c)(1),
(2) Date: Jun. 24, 2019

(87) PCT Pub. No.: WO2018/120101
PCT Pub. Date: Jul. 5, 2018

(65) Prior Publication Data
US 2020/0092769 A1  Mar. 19, 2020

(51) Int. Cl.
*H04W 36/32* (2009.01)
*H04W 36/08* (2009.01)
(Continued)

(52) U.S. Cl.
CPC ...... *H04W 36/0072* (2013.01); *H04B 7/0695* (2013.01); *H04B 7/088* (2013.01);
(Continued)

(58) Field of Classification Search
CPC . H04W 36/00; H04W 36/30; H04W 36/0072; H04W 36/0085; H04W 36/12;
(Continued)

(56) References Cited

U.S. PATENT DOCUMENTS 6,321,090 B1 * 11/2001 Soliman ............. H04W 36/32
455/440
8,285,290 B2 * 10/2012 Arora ............. H04W 36/0016
455/438
(Continued)

FOREIGN PATENT DOCUMENTS

CN  103875190 A  6/2014
CN  104734760 A  6/2015
(Continued)

OTHER PUBLICATIONS

Supplementary European Search Report in European Patent application No. 16925324.2, dated Oct. 1, 2019.
(Continued)

Primary Examiner — William D Cumming
(74) Attorney, Agent, or Firm — Ladas & Parry LLP

(57) ABSTRACT

Provided are information transmission methods, network devices and terminal devices, which may reduce an access delay. The method includes that: a target cell acquires configuration information of a measured signal, the configuration information of the measured signal being used for a terminal device to send the measured signal according to the configuration information of the measured signal; the target cell determines a beam corresponding to at least one uplink transmission channel of the target cell according to the measured signal sent by the terminal device; and the target cell transmits the at least one uplink transmission channel through the beam corresponding to the at least one uplink transmission channel of the target cell.

9 Claims, 7 Drawing Sheets

(51) Int. Cl.
*H04W 16/28* (2009.01)
*H04W 24/10* (2009.01)
*H04W 36/36* (2009.01)
*H04W 36/00* (2009.01)
*H04B 7/06* (2006.01)
*H04B 7/08* (2006.01)

(52) U.S. Cl.
CPC ... *H04W 36/0077* (2013.01); *H04W 36/0085* (2018.08); *H04W 36/08* (2013.01)

(58) Field of Classification Search
CPC ... H04W 76/27; H04W 34/08; H04W 56/001; H04W 72/04; H04W 36/0016; H04W 24/10; H04W 28/06; H04W 36/00835; H04W 36/32; H04W 36/0058; H04W 72/0428; H04W 74/004; H04W 36/36; H04W 74/08; H04W 16/28; H04W 36/08
USPC ............... 455/436, 425, 331, 438, 440, 332
See application file for complete search history.

(56) References Cited

U.S. PATENT DOCUMENTS

| | | | |
|---|---|---|---|
| 9,237,582 B2 | 1/2016 | Seol et al. | |
| 9,450,661 B2 | 9/2016 | Yu | |
| 2009/0291686 A1* | 11/2009 | Alpert | H04W 36/0085 455/436 |
| 2012/0115463 A1* | 5/2012 | Weng | H04B 17/318 455/425 |
| 2013/0040684 A1 | 2/2013 | Yu | |
| 2013/0059587 A1* | 3/2013 | Lindoff | H04W 36/0058 455/436 |
| 2013/0156008 A1* | 6/2013 | Dinan | H04W 72/0426 370/332 |
| 2013/0201938 A1 | 8/2013 | Seol et al. | |
| 2015/0049650 A1 | 2/2015 | Choi | |
| 2016/0099763 A1 | 4/2016 | Chen | |
| 2017/0005711 A1 | 1/2017 | Yu et al. | |
| 2017/0006508 A1* | 1/2017 | Moon | H04W 36/0072 |
| 2017/0033854 A1 | 2/2017 | Yoo | |
| 2017/0207843 A1* | 7/2017 | Jung | H04W 74/004 |
| 2017/0230093 A1 | 8/2017 | Yu et al. | |
| 2018/0124676 A1* | 5/2018 | Zeng | H04W 36/36 |
| 2018/0192426 A1* | 7/2018 | Ryoo | H04W 74/0833 |
| 2018/0343043 A1* | 11/2018 | Hakola | H04B 7/0417 |
| 2019/0124538 A1* | 4/2019 | Tang | H04W 24/10 |
| 2019/0174406 A1* | 6/2019 | Hwang | H04W 48/16 |
| 2019/0174477 A1* | 6/2019 | Chai | H04W 16/28 |
| 2019/0223057 A1* | 7/2019 | Park | H04W 36/08 |
| 2019/0223061 A1* | 7/2019 | Deng | H04W 36/0016 |
| 2019/0254074 A1* | 8/2019 | Jeon | H04W 56/001 |
| 2019/0327641 A1* | 10/2019 | Mok | H04W 76/27 |
| 2019/0342896 A1* | 11/2019 | Kusashima | H04W 72/046 |
| 2019/0394663 A1* | 12/2019 | Yang | H04B 17/327 |
| 2019/0394762 A1* | 12/2019 | Tang | H04W 72/085 |
| 2020/0022126 A1* | 1/2020 | You | H04W 74/002 |
| 2020/0092769 A1* | 3/2020 | Yang | H04W 36/0085 |

FOREIGN PATENT DOCUMENTS

| | | |
|---|---|---|
| CN | 105790913 A | 7/2016 |
| CN | 105812035 A | 7/2016 |
| CN | 106134236 A | 11/2016 |
| EP | 3131328 A1 | 2/2017 |
| KR | 20060099410 A | 9/2006 |
| WO | 2013119038 A1 | 8/2013 |

OTHER PUBLICATIONS

English translation of the Written Opinion of the International Search Authority in International Patent Application No. PCT/CN2016/113684, dated Sep. 22, 2017.
Samsung: "More details for the "NR cell"", 3GPP Draft; R2-164726 NR Cell Details, 3rd Generation Partnership Project(3GPP), Mobile Competence Centre; 650, Route Des Lucioles; F-06921 Sophia-Antipolis Cedex; France, vol. RAN WG1, no. Gothenburg, Sweden; Aug. 22, 2016-Aug. 26, 2016 Aug. 21, 2016(Aug. 21, 2016), XP051126484, Retrieved from the Internet: URL: http://www.3gpp.org/ftp/Meetings_3GPP_SYNC/RAN2/Docs/ <retrieved on Aug. 21, 2016> Table 1.
International search report in international application No. PCT/CN2016/113684, dated Sep. 21, 2017.
Written opinion of the international search authority in international application No. PCT/CN2016/113684, dated Sep. 21, 2017.
First Office Action of the Chinese application No. 201680091493.1, dated Jun. 10, 2020.
Second Office Action of the Chinese application No. 201680091493.1, dated Aug. 11, 2020.

* cited by examiner

500

┌─────────────────────────────────────────────────────────────┐
│ A target cell acquires configuration information of a measured signal, the │ 501
│ configuration information of the measured signal being used for a terminal │
│ device to send the measured signal according to the configuration │
│ information of the measured signal │
└─────────────────────────────────────────────────────────────┘
                              ↓
┌─────────────────────────────────────────────────────────────┐ 502
│ The target cell determines a beam corresponding to at least one uplink │
│ transmission channel of the target cell according to the measured signal sent │
│ by the terminal device │
└─────────────────────────────────────────────────────────────┘
                              ↓
┌─────────────────────────────────────────────────────────────┐ 503
│ The target cell transmits the at least one uplink transmission channel through │
│ the beam corresponding to the at least one uplink transmission channel of │
│ the target cell │
└─────────────────────────────────────────────────────────────┘

┌─────────────────────────────────────────────────────────────┐ 601
│ A terminal device sends a measured signal, the measured signal being used │
│ for a target cell to determine identification information of a beam │
│ corresponding to at least one uplink transmission channel of the terminal │
│ device and/or resource information for transmission of the at least one uplink │
│ transmission channel │
└─────────────────────────────────────────────────────────────┘
                              ↓
┌─────────────────────────────────────────────────────────────┐ 602
│ The terminal device receives a notification message of a source cell, the │
│ notification message including the identification information of the beam │
│ corresponding to the at least one uplink transmission channel of the terminal │
│ device and/or the resource information for transmission of the at least one │
│ uplink transmission channel, which are/is determined by the target cell │
└─────────────────────────────────────────────────────────────┘

FIG. 6

INFORMATION TRANSMISSION METHOD, NETWORK DEVICE AND TERMINAL DEVICE

RELATED APPLICATION

This application is an application under 35 U.S.C. 371 of International Application No. PCT/CN2016/113684 filed on Dec. 30, 2016, the entire contents of which are incorporated herein by reference.

TECHNICAL FIELD

The application relates to the field of communication, and more particularly to an information transmission method, a network device and a terminal device.

BACKGROUND

In a 5th-Generation (5G) system (or called a New Radio (NR) system), coverage in different directions and areas may be implemented by multi-beam. For uplink transmission, a network device has multiple uplink receiving beams, a terminal device has multiple uplink transmitting beams, the uplink receiving beams are required to be matched with the uplink transmitting beams to acquire a good receiving effect, and poor matching may cause poor uplink receiving performance or ineffective reception.

A terminal device, when accessing a network device, is usually required to try different uplink transmitting beams to send signals, and meanwhile, the network device is also required to try different uplink receiving beams to find the optimally matched uplink transmitting beam and uplink receiving beam. The network device usually corresponds to a large number of uplink receiving beams, and thus a long access delay will be caused for determining the specific uplink beam for sending a random access related signal for access to the network device if the terminal device sequentially tries the signal condition that each uplink transmitting beam is matched with each receiving beam of the network device.

SUMMARY

The embodiments of the application provide information transmission methods, network devices and terminal devices, which may reduce an access delay.

In a first aspect, an information transmission method is provided. The method includes that a target cell acquires configuration information of a measured signal, the configuration information of the measured signal being used for a terminal device to send the measured signal according to the configuration information of the measured signal; the target cell determines a beam corresponding to at least one uplink transmission channel of the target cell according to the measured signal sent by the terminal device; and the target cell transmits the at least one uplink transmission channel through the beam corresponding to the at least one uplink transmission channel of the target cell.

Optionally, the method may further include that: the target cell determines identification information of a beam corresponding to at least one uplink transmission channel of the terminal device and/or resource information for transmission of the at least one uplink transmission channel according to the measured signal sent by the terminal device.

The target cell sends a first notification message to a source cell, the first notification message including the identification information of the beam corresponding to the at least one uplink transmission channel of the terminal device and/or the resource information for transmission of the at least one uplink transmission channel, which are/is determined by the target cell.

Optionally, the configuration information of the measured signal may include at least one of: information about a time-domain resource for sending the measured signal, information about a frequency-domain resource for sending the measured signal, information about a channel or signal resource for sending the measured signal and a manner for sending the measured signal.

Optionally, the configuration information of the measured signal may be determined by negotiation between the source cell and the target cell.

Optionally, the operation that the target cell acquires the configuration information of the measured signal may include that: the target cell receives the configuration information of the measured signal from the source cell, the configuration information of the measured signal being determined by the source cell according to information of a signal periodically sent by the terminal device.

Optionally, the identification information of the beam corresponding to the at least one uplink transmission channel of the terminal device may include a beam identifier or serial number of the beam corresponding to the at least one uplink transmission channel of the terminal device.

The resource information for transmission of the at least one uplink transmission channel may include at least one of: information about a time-domain resource for transmitting the at least one uplink transmission channel and information about a frequency-domain resource for transmitting the at least one uplink transmission channel.

Optionally, the source cell and the target cell may belong to the same network device.

Optionally, the source cell and the target cell may belong to different network devices.

In a second aspect, an information transmission method is provided, which may include that: a terminal device sends a measured signal, the measured signal being used for a target cell to determine identification information of a beam corresponding to at least one uplink transmission channel of the terminal device and/or resource information for transmission of the at least one uplink transmission channel; and the terminal device receives a notification message from a source cell, the notification message including the identification information of the beam corresponding to the at least one uplink transmission channel of the terminal device and/or the resource information for transmission of the at least one uplink transmission channel, which are/is determined by the target cell.

Optionally, the identification information of the beam corresponding to the at least one uplink transmission channel of the terminal device may include a beam identifier or serial number of the beam corresponding to the at least one uplink transmission channel of the terminal device.

The resource information for transmission of the at least one uplink transmission channel may include at least one of: information about a time-domain resource for transmitting the at least one uplink transmission channel and information about a frequency-domain resource for transmitting the at least one uplink transmission channel.

Optionally, the measured signal may be a signal periodically sent by the terminal device.

Optionally, the method may further include that: the terminal device receives configuration information of the measured signal from the source cell, the configuration information of the measured signal being determined by negotiation between the source cell and the target cell and the configuration information of the measured signal being used for the terminal device to send the measured signal according to the configuration information of the measured signal.

Optionally, the configuration information of the measured signal may include at least one of:

information about a time-domain resource for sending the measured signal, information about a frequency-domain resource for sending the measured signal, information about a channel or signal resource for sending the measured signal and a manner for sending the measured signal.

Optionally, the method may further include that: the terminal device sends a random access signal on a resource indicated by the resource information for transmission of the at least one uplink transmission channel through the beam corresponding to the identification information, determined by the target cell, of the beam corresponding to the at least one uplink transmission channel of the terminal device to access the target cell.

Optionally, the measured signal may further be configured for the target cell to determine a beam corresponding to at least one uplink transmission channel of the target cell.

Optionally, the source cell and the target cell may belong to a same network device.

Optionally, the source cell and the target cell may belong to different network devices.

In a third aspect, an information transmission method is provided, which may include that: a source cell receives a first notification message sent by a target cell, the first notification message including identification information of a beam corresponding to at least one uplink transmission channel of a terminal device and/or resource information for transmission of the at least one uplink transmission channel, which are/is determined by the target cell; and the source cell sends a second notification message to the terminal device, the second notification message including the identification information of the beam corresponding to the at least one uplink transmission channel of the terminal device and/or the resource information for transmission of the at least one uplink transmission channel, which are/is determined by the target cell.

Optionally, the identification information of the beam corresponding to the at least one uplink transmission channel of the terminal device and/or the resource information for transmission of the at least one uplink transmission channel may be determined by measuring, by the target cell, a measured signal on a resource indicated by configuration information of the measured signal, and the measured signal may be sent by the terminal device on the resource indicated by the configuration information of the measured signal.

Optionally, the configuration information of the measured signal may be determined by negotiation between the source cell and the target cell.

Optionally, the configuration information of the measured signal may be determined by the source cell according to information of a signal periodically sent by the terminal device, and the method may further include the following operation.

The source cell sends the configuration information of the measured signal to the target cell.

Optionally, the configuration information of the measured signal may include at least one of:

information about a time-domain resource for sending the measured signal, information about a frequency-domain resource for sending the measured signal, information about a channel or signal resource for sending the measured signal and a manner for sending the measured signal.

Optionally, the identification information of the beam corresponding to the at least one uplink transmission channel of the terminal device may include a beam identifier or serial number of the beam corresponding to the at least one uplink transmission channel of the terminal device.

The resource information for transmission of the at least one uplink transmission channel may include at least one of:

information about a time-domain resource for transmitting the at least one uplink transmission channel and information about a frequency-domain resource for transmitting the at least one uplink transmission channel.

Optionally, the source cell and the target cell may belong to the same network device.

Optionally, the source cell and the target cell may belong to different network devices.

A fourth aspect provides a network device, which includes units executing the method in the first aspect or any optional implementation modes thereof.

A fifth aspect provides a terminal device, which includes units executing the method in the second aspect or any optional implementation modes thereof.

A sixth aspect provides a network device, which includes units executing the method in the third aspect or any optional implementation modes thereof.

A seventh aspect provides a network device, which includes a memory, a processor and a transceiver. The memory is configured to store a program, the processor is configured to execute the program, and when the program is executed, the processor executes the method in the first aspect and any optional implementation modes thereof on the basis of the transceiver.

An eighth aspect provides a terminal device, which includes a memory, a processor and a transceiver. The memory is configured to store a program, the processor is configured to execute the program, and when the program is executed, the processor executes the method in the second aspect and any optional implementation modes thereof on the basis of the transceiver.

A ninth aspect provides a network device, which includes a memory, a processor and a transceiver. The memory is configured to store a program, the processor is configured to execute the program, and when the program is executed, the processor executes the method in the third aspect and any optional implementation modes thereof on the basis of the transceiver.

A tenth aspect provides a computer-readable medium, which stores a program code configured to be executed by a terminal device, the program code including an instruction configured to execute the method in the first aspect or each implementation mode thereof.

An eleventh aspect provides a computer-readable medium, which stores a program code configured to be executed by a terminal device, the program code including an instruction configured to execute the method in the second aspect or each implementation mode thereof.

A twelfth aspect provides a computer-readable medium, which stores a program code configured to be executed by a terminal device, the program code including an instruction configured to execute the method in the third aspect or each implementation mode thereof.

On the basis of the technical solutions, according to the information transmission methods of the embodiments of the application, a target cell may measure a measured signal sent by a terminal device according to configuration information of the measured signal, thereby determining the beam corresponding to at least one uplink transmission channel of the target cell, and the target cell may transmit the at least one uplink transmission channel through the beam corresponding to the at least one uplink transmission channel. Since the beam, determined by the target cell, corresponding to the at least one uplink transmission channel of the target cell is determined according to the measured signal sent by the terminal device, the beam corresponding to the at least one uplink transmission channel of the target cell is matched relatively well with a transmitting beam used by the terminal device, and the target cell may receive a random access related signal sent by the terminal device through the beam corresponding to the at least one uplink transmission channel of the target cell. Therefore, a random access delay may be reduced.

BRIEF DESCRIPTION OF DRAWINGS

FIG. 5 is a schematic flowchart of an information transmission method according to an embodiment of the application.

FIG. 6 is a schematic flowchart of an information transmission method according to an embodiment of the application.

DETAILED DESCRIPTION

The technical solutions in the embodiments of the application will be described below in combination with the drawings in the embodiments of the application.

The technical solutions of the embodiments of the application may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD) system, a Universal Mobile Telecommunication System (UMTS), a Worldwide Interoperability for Microwave Access (WiMAX) communication system or a future 5G system.

Figure 1:
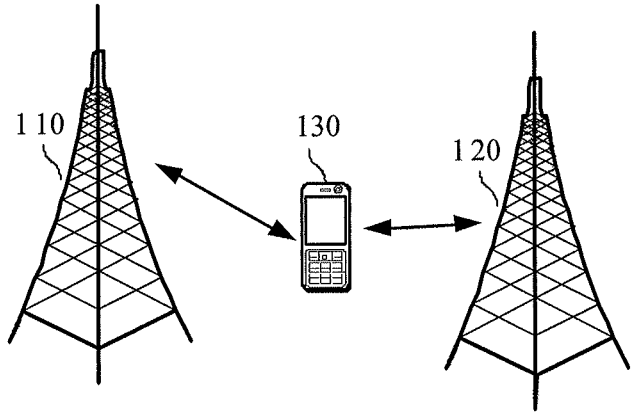
FIG. 1 is a schematic diagram of a communication system according to an embodiment of the application.

FIG. 1 illustrates a wireless communication system 100 to which the embodiments of the application are applied. The wireless communication system 100 may include a network device 110 and a network device 120. The network device 110 and the network device 120 may be devices communicating with a terminal device. The network device 110 and the network device 120 may provide communication coverage for a specific geographical region and may communicate with a terminal device (for example, User Equipment (UE)) in the coverage. Optionally, each of the network device 110 and the network device 120 may be a Base Transceiver Station (BTS) in a GSM or a CDMA system, or may be a NodeB (NB) in a WCDMA system, or may be an Evolutional Node B (eNB or eNodeB) in an LTE system or a wireless controller in a Cloud Radio Access Network (CRAN). Or the network device may be a relay station, an access point, a Transmission Reception Point (TRP), a vehicle-mounted device, a wearable device, a network-side device in a future 5G network, a network device in a future evolved Public Land Mobile Network (PLMN) or the like.

The wireless communication system 100 further includes at least one terminal device 130 within the coverage of the network device 110 or the network device 120. The terminal devices 130 may be mobile or fixed. Optionally, the terminal device 130 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, a processing device connected to a wireless modem, a vehicle-mounted device, a wearable device, a terminal device in a future 5G network, a terminal device in a future evolved PLMN or the like.

Optionally, the 5G system or network may also be called an NR system or network.

Two network devices and a terminal device are exemplarily shown in FIG. 1. Optionally, the wireless communication system 100 may include more network devices and other number of terminal devices may be included in coverage of each network device. There are no limits made thereto in the embodiments of the application.

Optionally, the wireless communication system 100 may further include a network controller, a mobility management entity or other network entities. There are no limits made thereto in the embodiments of the application.

It is to be understood that terms "system" and "network" in the disclosure may usually be exchanged in the disclosure. In the disclosure, the term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that former and latter associated objects form an "or" relationship.

A cell handover process includes a process that a terminal device which is using network service moves from one cell (called a "source cell") to another cell (called a "target cell") or that a communication link between the terminal device and the source cell is transferred to the target cell due to wireless transmission service load regulation, activation operation maintenance, device failure and the like, for ensuring communication continuity and quality of service.

In an LTE system, cell handover of a terminal device may include intra-station handover (that is, a source cell and a target cell belong to the same network device) and inter-station handover (that is, the source cell and the target cell belong to different network devices). The inter-station handover may further include X2-interface-based handover and S1-interface-based handover, and under the condition that an X2 interface is complete in data configuration and works well, X2-interface-based handover may be performed. Generally speaking, a priority of X2-interface-based handover is higher than that of S1-interface-based handover.

Figure 2:
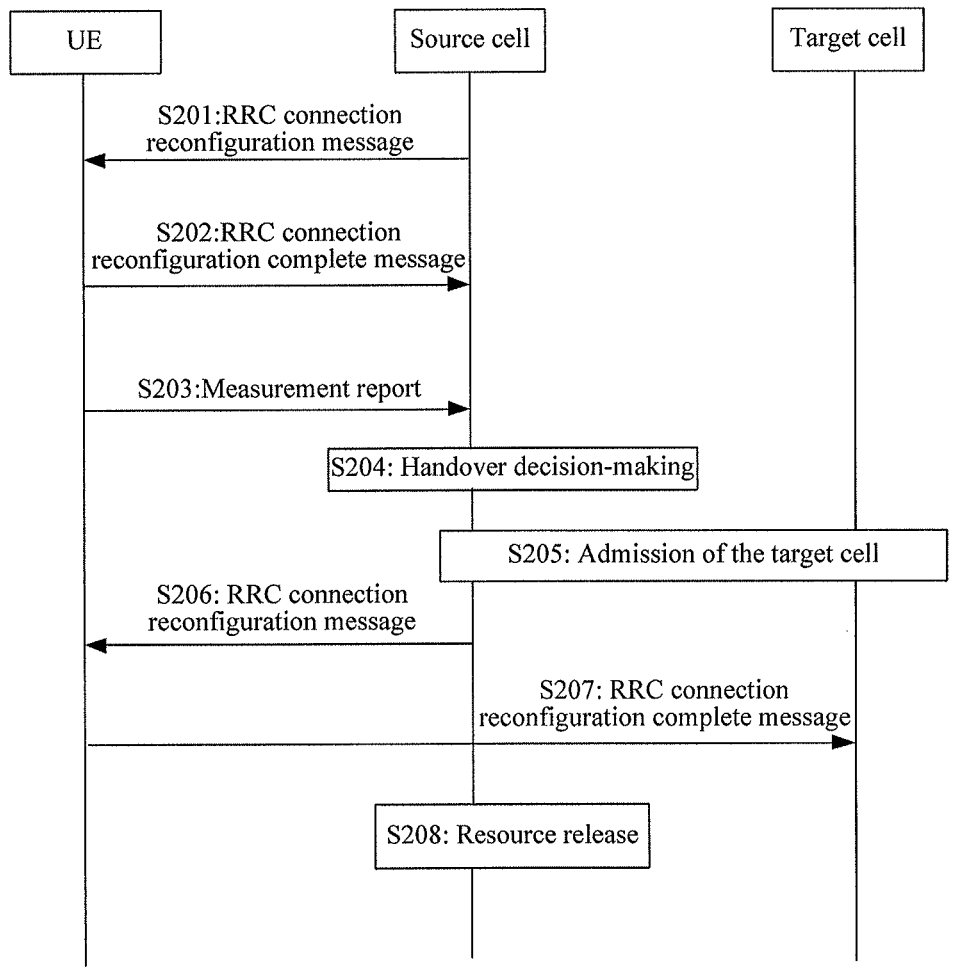
FIG. 2 is a schematic flowchart of an intra-station handover method according to a conventional art.

FIG. 2 is a schematic flowchart of an intra-station handover method according to the conventional art. As shown in FIG. 2, an intra-station handover process may include the following operations.

In S201, a network device configures a measurement type of a terminal device. The network device sends a Radio Resource Control (RRC) connection reconfiguration message to the terminal device to configure the measurement type of the terminal device.

In S202, the terminal device makes measurement configuration at an RRC protocol end of the terminal device according to the measurement type transmitted by the network device, and sends an RRC connection reconfiguration complete message to the network device to indicate that measurement configuration is completed.

In S203, the terminal device sends a measurement report to the network device according to information of the measurement configuration.

In S204, the network device makes a handover decision according to the measurement report, the network device being a network device to which a source cell and a target cell belong.

In S205, if such a decision that the terminal device executes handover in the network device, i.e., intra-station handover, is made, resource admission is performed in the target cell, and after successful resource admission, the network device applies for a new air interface resource for the terminal device.

In S206, after successful resource application, the network device sends the RRC connection reconfiguration message to the terminal device to indicate the terminal device to initiate a handover.

In S207, the terminal device accesses the target cell, and then sends the RRC connection reconfiguration complete message to the network device to indicate that the terminal device has accessed the target cell.

In S208, the network device, after receiving the RRC connection reconfiguration complete message, releases the resource used by the terminal device in the source cell.

Here, S201-S205 form a handover preparation, S206 and S207 form a handover execution, and S208 represents a handover completion.

Figure 3:
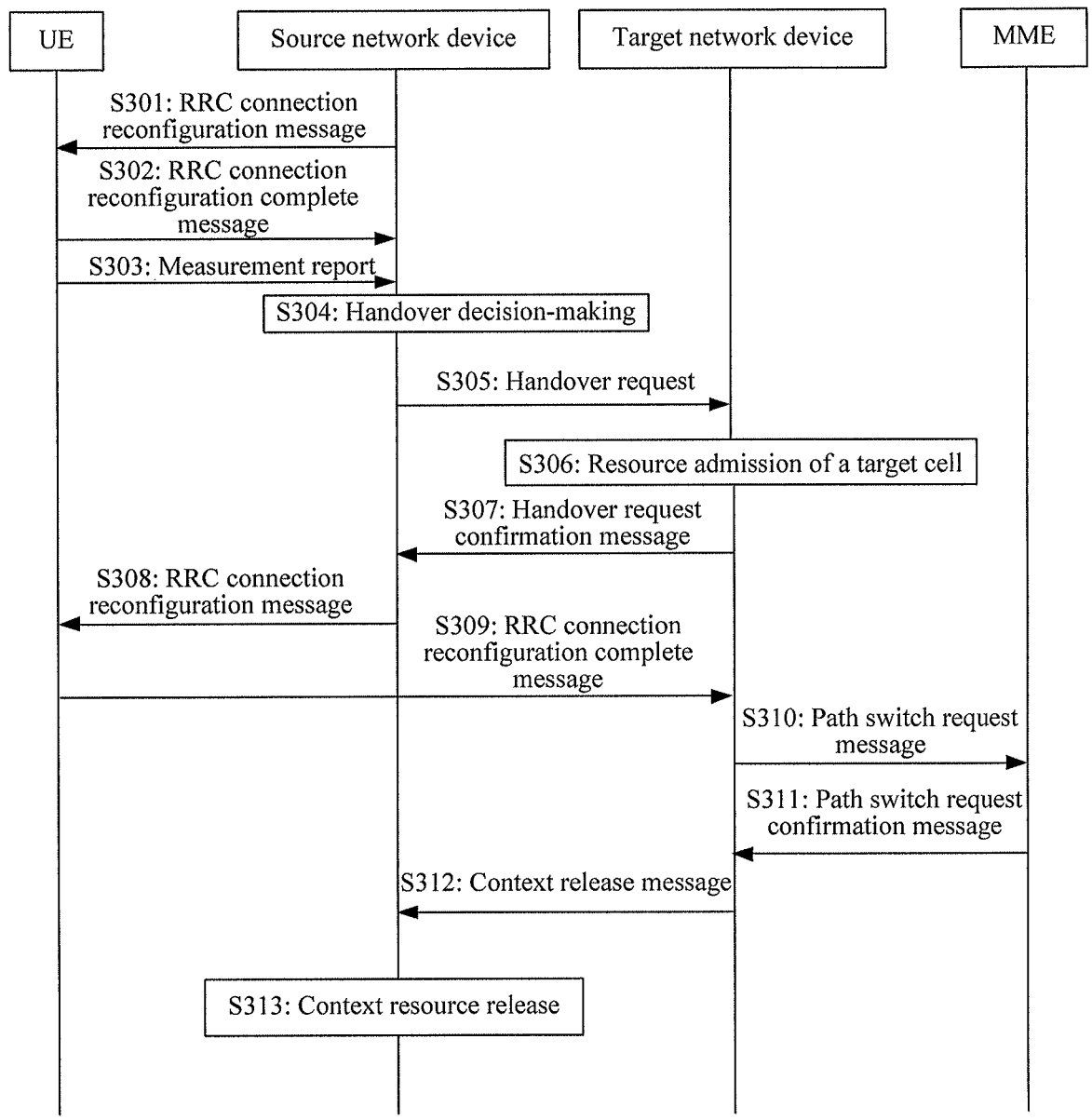
FIG. 3 is a schematic flowchart of an X2-interface-based inter-station handover method according to the conventional art.

FIG. 3 is a schematic flowchart of an X2-interface-based inter-station handover method according to the conventional art. As shown in FIG. 3, an inter-station handover may include the following operations.

In S301, a source network device configures a measurement type of a terminal device. The source network device sends an RRC connection reconfiguration message to the terminal device to configure the measurement type of the terminal device, the source network device being a network device to which a source cell belongs.

In S302, the terminal device makes measurement configuration at an RRC protocol end of the terminal device according to the measurement type transmitted by the source network device, and sends an RRC connection reconfiguration complete message to the source network device to indicate that measurement configuration is completed.

In S303, the terminal device sends a measurement report to the source network device according to measurement configuration information.

In S304, the source network device makes a handover decision according to the measurement report.

In S305, the source network device sends a handover request message to a target network device to indicate the target network device to make handover preparations, the target network device being a network device to which a target cell belongs.

In S306, the target network device makes resource admission and allocates an air interface resource and a System Architecture Evolution (SAE) bearer resource of a service for access of the terminal device.

In S307, the target network device, after successful resource admission, sends a handover request confirmation message to the source network device to indicate that handover preparations are completed.

In S308, the source network device configures an allocated dedicated access signature for the terminal device, and sends an RRC connection reconfiguration message to the terminal device to indicate the terminal device to execute a handover operation.

In S309, the terminal device sends an RRC connection reconfiguration complete message to the target network device to indicate that the terminal device has accessed the target cell.

In S310, the target network device sends a path switch request (PATH SWITCH REQ) to a Mobility Management Entity (MME) to request the MME to update a node address of a service data channel and notify the MME to switch a connection path of service data.

In S311, the MME successfully updates the node address of the data channel, and sends a path switch request confirmation message to the target network device to indicate that service communication is allowed to be performed on a new SAE bearer.

In S312, since the terminal device has accessed the target cell and may perform service communication in the target cell, a resource used in the source cell is required to be released, and the target network device sends a terminal device context release message to the source network device.

In S313, the source network device releases context information of the terminal device, including the air interface resource and the SAE bearer resource.

Figure 4:
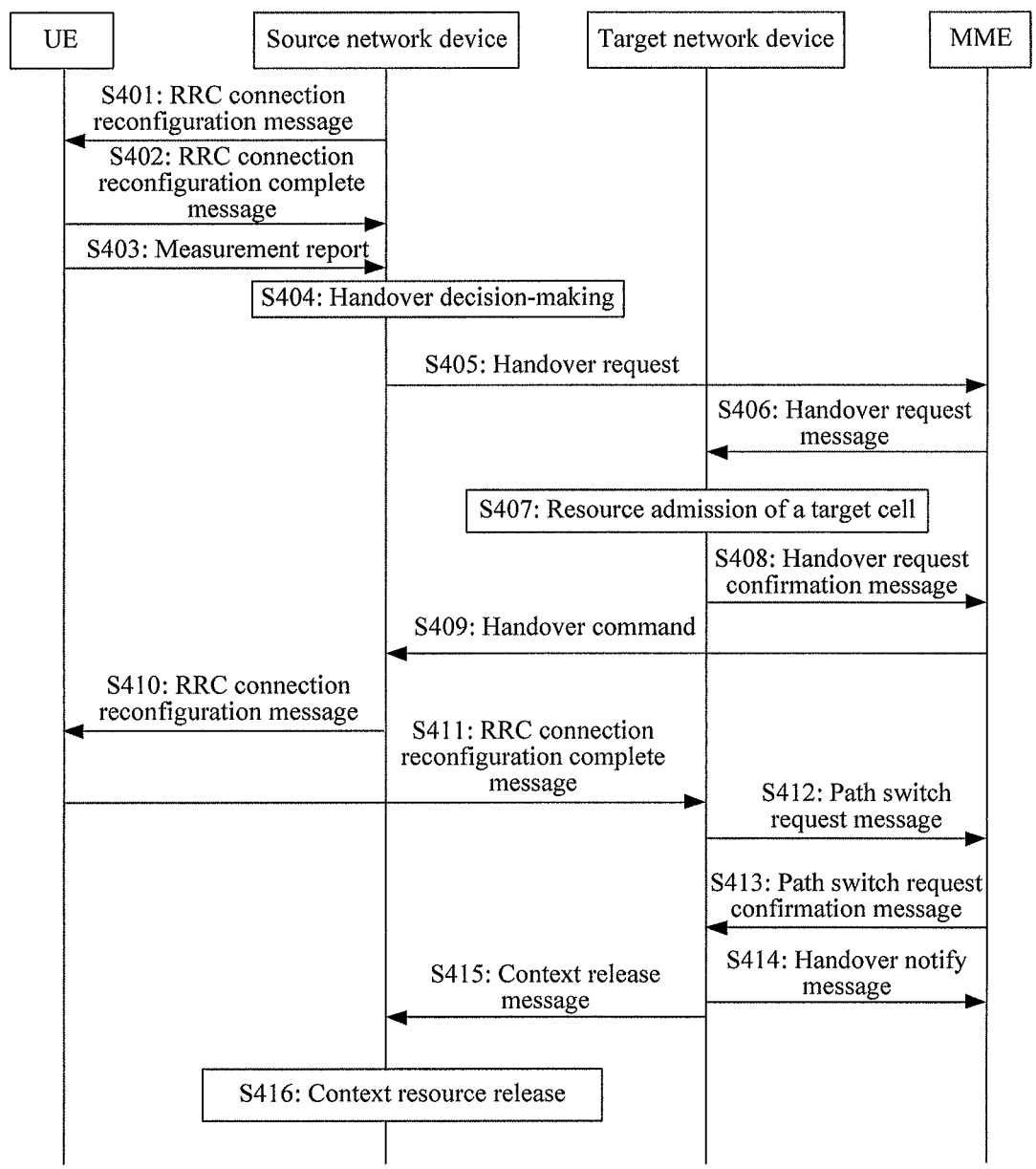
FIG. 4 is a schematic flowchart of an S1-interface-based inter-station handover method according to the conventional art.

FIG. 4 is a schematic flowchart of S1-interface-based inter-station handover according to the conventional art. As shown in FIG. 4, an inter-station handover process may include the following operations.

In S401, a source network device configures a measurement type of a terminal device. The network device sends an RRC connection reconfiguration message to the terminal device to configure the measurement type of the terminal device.

In S402, the terminal device makes measurement configuration at an RRC protocol end of the terminal device according to the measurement type transmitted by the source network device, and sends an RRC connection reconfiguration complete message to the source network device to indicate that measurement configuration is completed.

In S403, the terminal device sends a measurement report to the source network device according to information about the measurement configuration.

In S404, the source network device makes a handover decision according to the measurement report.

In S405, the source network device sends a handover request message to an MME.

In S406, the MME sends the handover request message to a target network device.

In S407, the target network device makes resource admission and allocates a resource of a target network device side for access of the terminal device.

In S408, the target network device, after successful resource admission, sends a handover request confirmation message to the MME to indicate that handover preparations are completed.

In S409, the MME sends a handover command to the source network device, the handover command including bearer information of the target network device side and an address of the target network device for forwarding service data during handover.

In S410, the source network device sends an RRC connection reconfiguration message to the terminal device to indicate the terminal device to access a target cell.

In S411, the target network device receives from the terminal device an RRC connection reconfiguration complete message indicating successful handover.

In S412, the target network device sends a path switch request to the MME to request the MME to update a node address of a service data channel and notify the MME to switch a connection path of service data.

In S413, the MME successfully updates the node address of the data channel, and sends a path switch request confirmation message to the target network device to indicate that service communication is allowed to be performed on a new SAE bearer.

In S414, the target network device sends a handover notify message to the MME to notify the MME that the terminal device has successfully accessed the target cell in the target network device.

In S415, the target network device sends a context release message to the source network device.

In S416, the source network device releases context information of the terminal device, including an air interface resource and an SAE bearer resource.

An information transmission method 500 of the embodiments of the application will be described below in combination with FIG. 5 from the aspect of a target cell. Specifically, the method 500 may be executed by a network device to which the target cell belongs. As shown in FIG. 5, the method 500 includes the following operations.

In S501, the target cell acquires configuration information of a measured signal, the configuration information of the measured signal being used for a terminal device to send the measured signal according to the configuration information of the measured signal.

In S502, the target cell determines a beam corresponding to at least one uplink transmission channel of the target cell according to the measured signal sent by the terminal device.

In S503, the target cell transmits the at least one uplink transmission channel through the beam corresponding to the at least one uplink transmission channel of the target cell.

Specifically, the target cell may acquire the configuration information of the measured signal. Optionally, the configuration information of the measured signal may be determined by negotiation between a source cell and the target cell, and in such case, the target cell may directly acquire the configuration information of the measured signal. Or the configuration information of the measured signal may also be sent to the target cell by the source cell. For example, the source cell may determine information of a signal which is being periodically sent at present by the terminal device as the configuration information of the measured signal, and then may send the determined configuration information of the measured signal to the target cell.

Optionally, in some embodiments, the configuration information of the measured signal includes at least one of:

information about a time-domain resource for sending the measured signal, information about a frequency-domain resource for sending the measured signal, information about a channel or signal resource for sending the measured signal, and a manner for sending the measured signal.

The target cell, after acquiring the configuration information of the measured signal, may measure the measured signal on a resource indicated by the configuration information of the measured signal, thereby determining the beam corresponding to the at least one uplink transmission channel of the target cell. Then, the target cell may transmit the at least one uplink transmission channel through the determined beam corresponding to the at least one uplink transmission channel. Since the beam corresponding to the at least one uplink transmission channel is determined by measuring, by the target cell, the measured signal sent by the terminal device, the beam corresponding to the at least one uplink transmission channel has relatively high receiving performance, and uplink transmission performance is further improved.

Optionally, in some embodiments, the method further includes the following operations.

The target cell determines identification information of a beam corresponding to at least one uplink transmission channel of the terminal device and/or resource information for transmission of the at least one uplink transmission channel according to the measured signal sent by the terminal device.

The target cell sends a first notification message to a source cell, the first notification message including the identification information of the beam corresponding to the at least one uplink transmission channel of the terminal device and/or the resource information for transmission of the at least one uplink transmission channel, which are/is determined by the target cell.

Specifically, the target cell may further determine the identification information of the beam corresponding to the at least one uplink transmission channel of the terminal device and/or the resource information for transmission of the at least one uplink transmission channel according to the measured signal sent by the terminal device. The target cell may further send the first notification message to the source cell to notify the source cell of the identification information of the beam corresponding to the at least one uplink transmission channel of the terminal device and/or the resource information for transmission of the at least one uplink transmission channel, which are/is determined by the target cell. Since the terminal device has yet not accessed the target cell and may not communicate with the target cell, the source cell may forward the message determined by the target cell to the terminal device, and then the terminal device may access the target cell through a resource indicated by the message, thereby avoiding a long access delay caused by the fact that the terminal device, when accessing the target cell, is required to try different transmitting beams to send a random access related signal.

Optionally, in some embodiments, the configuration information of the measured signal is determined by negotiation between the source cell and the target cell.

That is, the source cell and the target cell belong to different network devices, and the configuration information of the measured signal may be determined by signaling interaction between the two network devices. Or if the source cell and the target cell belong to the same network device, the configuration information of the measured signal may be determined by the network device.

Optionally, in some embodiments, the operation that the target cell acquires the configuration information of the measured signal includes the following operation.

The target cell receives the configuration information of the measured signal from the source cell, the configuration information of the measured signal being determined by the source cell according to information of a signal periodically sent by the terminal device.

Specifically, the configuration information of the measured signal may be determined by the source cell. If the terminal device is periodically sending a first signal, the source cell may also determine the configuration information of the measured signal according to information of the first signal, that is, the signal presently sent by the terminal device may be used as the measured signal measured by the target cell.

Optionally, in some embodiments, the identification information of the beam corresponding to the at least one uplink transmission channel of the terminal device includes a beam identifier or a serial number of the beam corresponding to the at least one uplink transmission channel of the terminal device.

The resource information for transmission of the at least one uplink transmission channel includes at least one of:

information about a time-domain resource for transmitting the at least one uplink transmission channel and information about a frequency-domain resource for transmitting the at least one uplink transmission channel.

Optionally, in some embodiments, the source cell and the target cell belong to the same network device.

Under this condition, handover of the terminal device between the source cell and the target cell is intra-station handover, and negotiation about the configuration information of the measured signal between the source cell and the target cell and sending of the first notification message from the target cell to the source cell may both be executed in S205 shown in FIG. 2.

Optionally, in some embodiments, the source cell and the target cell belong to different network devices.

Under this condition, handover of the terminal device between the source cell and the target cell is inter-station handover. For X2-interface-based inter-station handover, negotiation about the configuration information of the measured signal between the source cell and the target cell or sending of the first notification message from the target cell to the source cell may be executed in S305 and S307 shown in FIG. 3, that is, the source cell and the target cell may negotiate about the configuration information of the measured signal through a handover request message and a handover request confirmation message, or the first notification message may be the handover request confirmation message. Or, for S1-interface-based inter-station handover, negotiation about the configuration information of the measured signal between the source cell and the target cell or sending of the first notification message from the target cell to the source cell may be executed in part of operations in S405, S406, S408 and S409 shown in FIG. 4.

The information transmission method of the embodiments of the disclosure is described above in combination with FIG. 5 in detail from the aspect of the target cell and the information transmission method of the embodiments of the disclosure will be described below in combination with FIG. 6 in detail from the aspect of a terminal device. It is to be understood that descriptions made on a target cell side correspond to descriptions made on a terminal device side, and similar descriptions may refer to the above and, for avoiding repetitions, will not be elaborated herein.

FIG. 6 is a schematic flowchart of an information transmission method 600 described from the aspect of a terminal device according to an embodiment of the application. As shown in FIG. 6, the method 600 includes the following operations.

In S601, the terminal device sends a measured signal, the measured signal being used for a target cell to determine identification information of a beam corresponding to at least one uplink transmission channel of the terminal device and/or resource information for transmission of the at least one uplink transmission channel.

In S602, the terminal device receives a notification message from a source cell, the notification message including the identification information of the beam corresponding to the at least one uplink transmission channel of the terminal device and/or the resource information for transmission of the at least one uplink transmission channel, which are/is determined by the target cell.

Specifically, the terminal device may send a measured signal, and the measured signal may be configured for the target cell to measure the measured signal to determine the identification information of the beam corresponding to the at least one uplink transmission channel of the terminal device and/or the resource information for transmission of the at least one uplink transmission channel. The terminal device may further receive the notification message from the source cell, the notification message including the information determined by the target cell, so that the terminal device may transmit the uplink transmission channel through the beam corresponding to the at least one uplink transmission channel of the terminal device. Since the beam corresponding to the at least one uplink transmission channel of the terminal device is determined by measuring, by the target cell, the measured signal, the terminal device may directly access the target cell through the beam corresponding to the at least one uplink transmission channel, thereby avoiding a long access delay caused by the fact that each transmitting beam is sequentially tried to be used for sending a signal and then determining the transmitting beam with a relatively high matching degree with a receiving beam of the target cell.

Optionally, in some embodiments, the measured signal is further used for the target cell to determine a beam corresponding to at least one uplink transmission channel of the target cell.

That is, according to the measured signal, the target cell may not only determine the beam (the beam is a transmitting beam for uplink transmission) corresponding to the at least one uplink transmission channel of the terminal device but also determine the beam (the beam is a receiving beam for uplink transmission) corresponding to the at least one uplink transmission channel of the target cell, and the transmitting beam and the receiving beam are beams with a relatively high matching degree, so that the target cell may use the beam corresponding to the at least one uplink transmission channel of the target cell and the terminal device may use the beam corresponding to the at least one uplink transmission channel of the terminal device for uplink transmission. Therefore, uplink transmission performance is improved.

Optionally, in some embodiments, the identification information of the beam corresponding to the at least one uplink transmission channel of the terminal device includes a beam identifier or serial number of the beam corresponding to the at least one uplink transmission channel of the terminal device.

The resource information for transmission of the at least one uplink transmission channel includes at least one of:

information about a time-domain resource for transmitting the at least one uplink transmission channel and information about a frequency-domain resource for transmitting the at least one uplink transmission channel.

Optionally, in some embodiments, the measured signal is a signal periodically sent by the terminal device.

Specifically, if the terminal device is periodically sending a first signal, the source cell may also determine the configuration information of the measured signal according to information of the first signal, that is, the signal presently sent by the terminal device may be used as the measured signal measured by the target cell.

Optionally, in some embodiments, the method further includes the following operation.

The terminal device receives configuration information of the measured signal from the source cell, the configuration information of the measured signal being determined by negotiation between the source cell, and the target cell and the configuration information of the measured signal being used for the terminal device to send the measured signal according to the configuration information of the measured signal.

Here, the configuration information of the measured signal includes at least one of:

information about a time-domain resource for sending the measured signal, information about a frequency-domain resource for sending the measured signal, information about a channel or signal resource for sending the measured signal and a manner for sending the measured signal.

That is, the configuration information of the measured signal may be determined by signaling interaction between the source cell and the target cell. If the source cell and the target cell belong to different network devices, the configuration information of the measured signal may be determined by signaling interaction between the two network devices. If the source cell and the target cell belong to the same network device, the configuration information of the measured signal may be determined by the network device.

Optionally, in some embodiments, the method further includes the following operation.

The terminal device sends a random access signal on a resource indicated by the resource information for transmission of the at least one uplink transmission channel through the beam corresponding to the identification information, determined by the target cell, of the beam corresponding to the at least one uplink transmission channel of the terminal device to access the target cell.

Specifically, the terminal device, after receiving the notification message sent by the source cell, may acquire the identification information of the beam corresponding to the at least one uplink transmission channel of the terminal device and/or the resource information for transmission of the at least one uplink transmission channel, so that the terminal device sends the random access related signal, for example, a random access preamble, on the resource indicated by the resource information for transmission of the at least one uplink transmission channel through the beam corresponding to the identification information of the beam corresponding to the at least one uplink transmission channel of the terminal device to access the target cell.

Optionally, in some embodiments, the source cell and the target cell belong to the same network device.

Under this condition, handover of the terminal device between the source cell and the target cell is intra-station handover, and negotiation about the configuration information of the measured signal between the source cell and the target cell may be executed in S205 shown in FIG. 2, and reception of the notification message by the terminal device from the source cell may be executed in S206 shown in FIG. 2.

Optionally, in some embodiments, the source cell and the target cell belong to different network devices.

Under this condition, handover of the terminal device between the source cell and the target cell is inter-station handover. For X2-interface-based inter-station handover, reception of the notification message by the terminal device from the source cell may be executed in S308 shown in FIG. 3. Or, for S1-interface-based inter-station handover, reception of the notification message by the terminal device from the source cell may be executed in S410 shown in FIG. 4.

The information transmission method of the embodiments of the disclosure is described above in combination with FIG. 5 and FIG. 6 in detail from the aspect of the target cell and the terminal device, and the information transmission method of the embodiments of the disclosure will be described below in combination with FIG. 7 in detail from the aspect of a source device. It is to be understood that descriptions made on a source cell side correspond to descriptions made on a terminal device and target cell side, and similar descriptions may refer to the above and, for avoiding repetitions, will not be elaborated herein.

Figure 7:
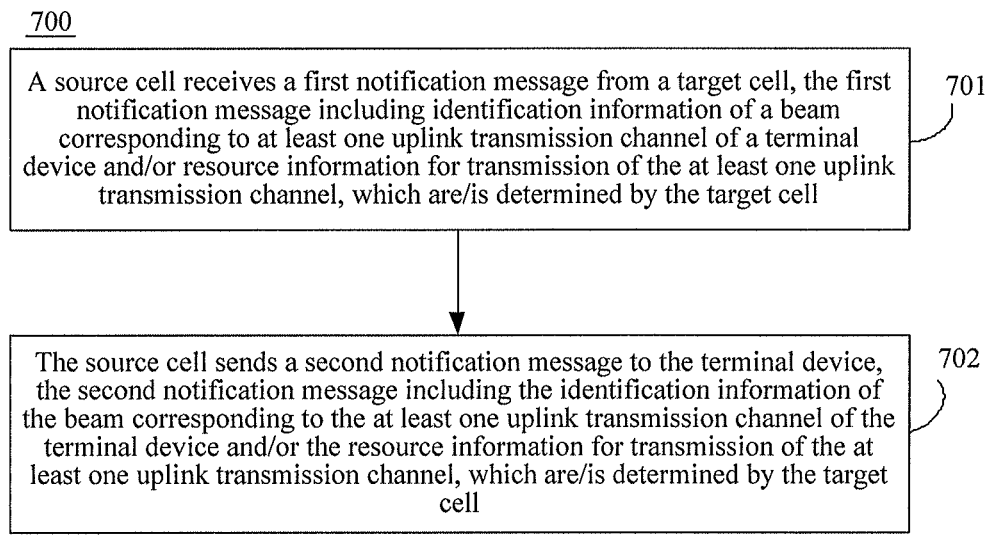
FIG. 7 is a schematic flowchart of an information transmission method according to an embodiment of the application.

FIG. 7 is a schematic flowchart of an information transmission method 700 described from the aspect of a source cell according to an embodiment of the application. Specifically, the method 700 may be executed by a network device to which the source cell belongs. As shown in FIG. 7, the method 700 includes the following contents.

In S701, the source cell receives a first notification message sent by a target cell, the first notification message including identification information of a beam corresponding to at least one uplink transmission channel of a terminal device and/or resource information for transmission of the at least one uplink transmission channel, which are/is determined by the target cell.

In S702, the source cell sends a second notification message to the terminal device, the second notification message including the identification information of the beam corresponding to the at least one uplink transmission channel of the terminal device and/or the resource information for transmission of the at least one uplink transmission channel, which are/is determined by the target cell.

Specifically, the source cell and the target cell may be cells under the same network device or cells under different network devices. The source cell may receive the first notification message sent by the target cell, the first notification message including the identification information of the beam corresponding to the at least one uplink transmission channel of the terminal device and/or the resource information for transmission of the at least one uplink transmission channel, which are/is determined by the target cell. The source cell may also send the second notification message to the terminal device, the second notification message including the identification information of the beam corresponding to the at least one uplink transmission channel of the terminal device and/or the resource information for transmission of the at least one uplink transmission channel, which are/is determined by the target cell, so that the terminal device may know about the specific beam to be used for sending a random access related signal, for example, a random access preamble, to the target cell before handover to the target cell, and is not required to sequentially try using each transmitting beam to send the random access related signal. Therefore, a random access delay is reduced.

Optionally, in some embodiments, the identification information of the beam corresponding to the at least one uplink transmission channel of the terminal device and/or the resource information for transmission of the at least one uplink transmission channel are/is determined by measuring, by the target cell, a measured signal on a resource indicated by configuration information of the measured signal, and the measured signal is sent by the terminal device on the resource indicated by the configuration information of the measured signal.

That is, the terminal device may send the measured signal on the resource indicated by the configuration information of the measured signal, and the target cell may measure the measured signal sent by the terminal device on the resource, thereby determining the identification information of the beam corresponding to the at least one uplink transmission channel of the terminal device, or the resource information for transmission of the at least one uplink transmission channel, or the identification information of the beam corresponding to the at least one uplink transmission channel and the resource information for transmission of the at least one uplink transmission channel.

Optionally, in some embodiments, the configuration information of the measured signal includes at least one of:

information about a time-domain resource for sending the measured signal, information about a frequency-domain resource for sending the measured signal, information about a channel or signal resource for sending the measured signal, and a manner for sending the measured signal.

Optionally, in some embodiments, the configuration information of the measured signal is determined by negotiation between the source cell and the target cell.

That is, the configuration information of the measured signal may be determined by signaling interaction between the source cell and the target cell. If the source cell and the target cell belong to different network devices, the configuration information of the measured signal may be determined by signaling interaction between the two network devices. If the source cell and the target cell belong to the same network device, the configuration information of the measured signal may be determined by the network device.

Optionally, in some embodiments, the configuration information of the measured signal is determined by the source cell according to information of a signal periodically sent by the terminal device, and the method further includes the following operation.

The source cell sends the configuration information of the measured signal to the target cell.

Specifically, if the terminal device is periodically sending a first signal, the source cell may also determine the configuration information of the measured signal according to information of the first signal, that is, the signal presently sent by the terminal device may be used as the measured signal measured by the target cell.

The manner for sending the measured signal may include periodic sending, aperiodic sending, triggered sending or the like.

Optionally, in some embodiments, the identification information of the beam corresponding to the at least one uplink transmission channel of the terminal device includes a beam identifier or serial number of the beam corresponding to the at least one uplink transmission channel of the terminal device.

The resource information for transmission of the at least one uplink transmission channel includes at least one of:

information about a time-domain resource for transmitting the at least one uplink transmission channel and information about a frequency-domain resource for transmitting the at least one uplink transmission channel.

Optionally, in some embodiments, the source cell and the target cell belong to the same network device.

Under this condition, handover of the terminal device between the source cell and the target cell is intra-station handover. Negotiation about the configuration information of the measured signal between the source cell and the target cell and sending of the first notification message from the target cell to the source cell may both be executed in S205 shown in FIG. 2. Sending of the notification message from the source cell to the terminal device may be executed in S206.

Optionally, in some embodiments, the source cell and the target cell belong to different network devices.

Under this condition, handover of the terminal device between the source cell and the target cell is inter-station handover. For X2-interface-based handover, negotiation about the configuration information of the measured signal between the source cell and the target cell or sending of the first notification message from the target cell to the source cell may be executed in S305 and S307 shown in FIG. 3. That is, the source cell and the target cell may negotiate about the configuration information of the measured signal through a handover request message and a handover request confirmation message, or the first notification message may be the handover request confirmation message. Sending of the notification message from the source cell to the terminal device may be executed in S308 shown in FIG. 3, that is, the notification message may be an RRC connection reconfiguration message. Or, for S1-interface-based inter-station handover, negotiation about the configuration information of the measured signal between the source cell and the target cell may be executed in part of operations in S405, S406, S408 and S409 shown in FIG. 4. Sending of the notification message from the source cell to the terminal device may be executed in S410 shown in FIG. 4, that is, the notification message may be the RRC connection reconfiguration message.

The information transmission method according to the embodiments of the application are introduced above in combination with FIG. 5 to FIG. 7, and device embodiments according to the embodiments of the application will be introduced below in combination with FIG. 8 to FIG. 13. It is to be understood that the device embodiments correspond to the method embodiments and similar descriptions may refer to the method embodiments.

The information transmission method according to the embodiments of the application are introduced above in combination with FIG. 5 to FIG. 7, and a device according to the embodiments of the application will be introduced below in combination with FIG. 8 to FIG. 13.

Figure 8:
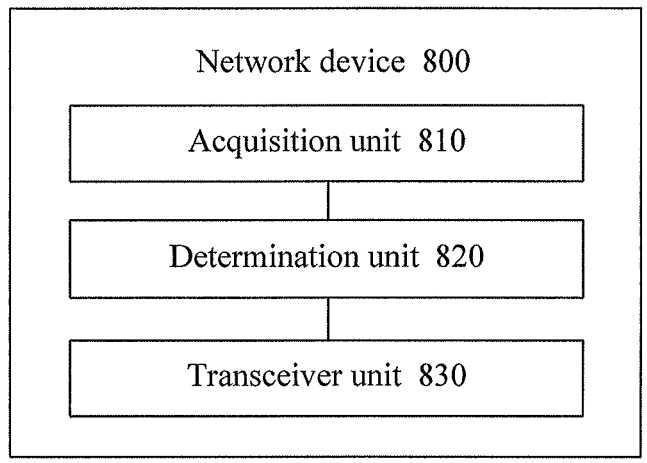
FIG. 8 is a schematic block diagram of a network device according to an embodiment of the application.

FIG. 8 is a schematic block diagram of a network device according to an embodiment of the application. As shown in FIG. 8, the network device 800 includes an acquisition unit 810, a determination unit 820 and a transceiver unit 830.

The acquisition unit 810 is configured to acquire configuration information of a measured signal, the configuration information of the measured signal being used for a terminal device to send the measured signal according to the configuration information of the measured signal.

The determination unit 820 is configured to determine a beam corresponding to at least one uplink transmission channel of the network device according to the measured signal sent by the terminal device.

The transceiver unit 830 is configured to transmit the at least one uplink transmission channel through the beam corresponding to the at least one uplink transmission channel of the network device, the network device being a network device to which a target cell belongs.

Optionally, in some embodiments, the determination unit 820 is further configured to:

determine identification information of a beam corresponding to at least one uplink transmission channel of the terminal device and/or resource information for transmission of the at least one uplink transmission channel according to the measured signal sent by the terminal device.

The transceiver unit 830 is further configured to:

send a first notification message to a first network device, the first notification message including the identification information of the beam corresponding to the at least one uplink transmission channel of the terminal device and/or the resource information for transmission of the at least one uplink transmission channel, which are/is determined by the network device, and the first network device being a network device to which a source cell belongs.

Optionally, in some embodiments, the configuration information of the measured signal includes at least one of:

information about a time-domain resource for sending the measured signal, information about a frequency-domain resource for sending the measured signal, information about a channel or signal resource for sending the measured signal, and a manner for sending the measured signal.

Optionally, in some embodiments, the configuration information of the measured signal is determined by negotiation between the first network device and the network device.

Optionally, in some embodiments, the transceiver unit 830 is further configured to:

receive the configuration information of the measured signal from the first network device, the configuration information of the measured signal being determined by the first network device according to information of a signal periodically sent by the terminal device.

Optionally, in some embodiments, the identification information of the beam corresponding to the at least one uplink transmission channel of the terminal device includes a beam identifier or serial number of the beam corresponding to the at least one uplink transmission channel of the terminal device.

The resource information for transmission of the at least one uplink transmission channel includes at least one of:

information about a time-domain resource for transmitting the at least one uplink transmission channel and information about a frequency-domain resource for transmitting the at least one uplink transmission channel.

Optionally, the first network device and the network device are the same network device.

For example, the first network device and the network device may be the same physical base station.

Optionally, in some embodiments, the first network device and the network device are different network devices.

For example, the first network device and the network device may be different physical base stations.

It is to be understood that the network device 800 may correspond to a target cell in the method 500, which may realize corresponding functions of the target cell and will not be elaborated herein for simplicity.

Figure 9:
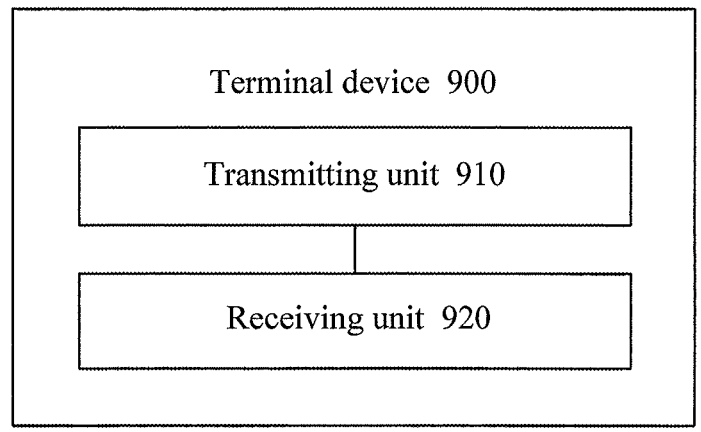
FIG. 9 is a schematic block diagram of a terminal device according to an embodiment of the application.

FIG. 9 is a schematic block diagram of a terminal device according to an embodiment of the application. As shown in FIG. 9, the terminal device 900 includes a transmitting unit 910 and a receiving unit 920.

The transmitting unit 910 is configured to send a measured signal, the measured signal being used for a first network device to determine identification information of a beam corresponding to at least one uplink transmission channel of the terminal device and/or resource information for transmission of the at least one uplink transmission channel, and the first network device being a network device to which a target cell belongs.

The receiving unit 920 is configured to receive a notification message from a second network device, the notification message including the identification information of the beam corresponding to the at least one uplink transmission channel of the terminal device and/or the resource information for transmission of the at least one uplink transmission channel, which are/is determined by the second network device, and the second network device being a network device to which a source cell belongs.

Optionally, in some embodiments, the identification information of the beam corresponding to the at least one uplink transmission channel of the terminal device includes a beam identifier or serial number of the beam corresponding to the at least one uplink transmission channel of the terminal device.

The resource information for transmission of the at least one uplink transmission channel includes at least one of:

information about a time-domain resource for transmitting the at least one uplink transmission channel, and information about a frequency-domain resource for transmitting the at least one uplink transmission channel.

Optionally, in some embodiments, the measured signal is a signal periodically sent by the terminal device.

Optionally, in some embodiments, the receiving unit 920 is further configured to:

receive configuration information of the measured signal from the second network device, the configuration information of the measured signal being determined by negotiation between the first network device and the second network device, and the configuration information of the measured signal being used for the terminal device to send the measured signal according to the configuration information of the measured signal.

Optionally, in some embodiments, the configuration information of the measured signal includes at least one of:

information about a time-domain resource for sending the measured signal, information about a frequency-domain resource for sending the measured signal, information about a channel or signal resource for sending the measured signal, and a manner for sending the measured signal.

Optionally, in some embodiments, the transmitting unit 910 is further configured to:

send a random access signal on a resource indicated by the resource information for transmission of the at least one uplink transmission channel through the beam corresponding to the identification information, determined by the first network device, of the beam corresponding to the at least one uplink transmission channel of the terminal device to access the second network device.

Optionally, in some embodiments, the measured signal is further used for the first network device to determine a beam corresponding to at least one uplink transmission channel of the first network device.

Optionally, the first network device and the second network device are the same network device.

For example, the first network device and the second network device may be the same physical base station.

Optionally, in some embodiments, the first network device and the second network device are different network devices.

For example, the first network device and the second network device may be different physical base stations.

It is to be understood that the terminal device 900 may correspond to a terminal device in the method 600, which may realize corresponding functions of the terminal device and will not be elaborated herein for simplicity.

Figure 10:
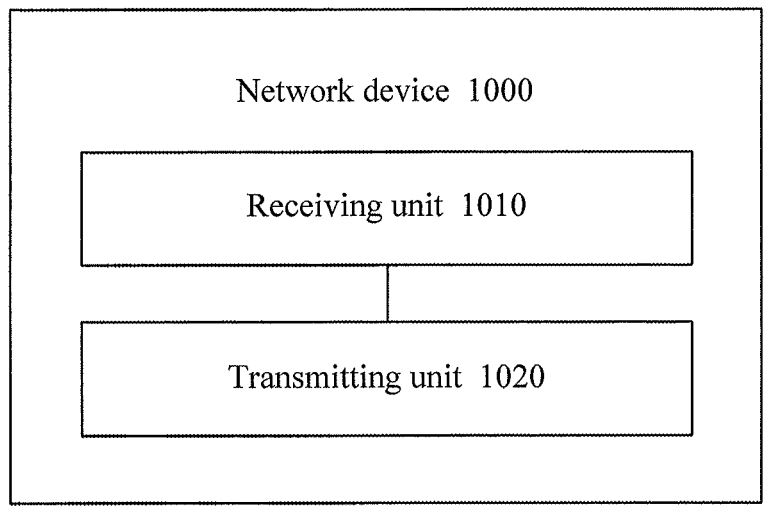
FIG. 10 is a schematic block diagram of a network device according to an embodiment of the application.

FIG. 10 is a schematic block diagram of a network device according to an embodiment of the application. As shown in FIG. 10, the network device 1000 includes a receiving unit 1010 and a transmitting unit 1020.

The receiving unit 1010 is configured to receive a first notification message from a first network device, the first notification message including identification information of a beam corresponding to at least one uplink transmission channel of a terminal device and/or resource information for transmission of the at least one uplink transmission channel, which are/is determined by the first network device, the network device being a network device to which a source cell belongs and the first network device being a network device to which a target cell belongs.

The transmitting unit 1020 is configured to send a second notification message to the terminal device, the second notification message including the identification information of the beam corresponding to the at least one uplink transmission channel of the terminal device and/or the resource information for transmission of the at least one uplink transmission channel, which are/is determined by the first network device.

Optionally, in some embodiments, the identification information of the beam corresponding to the at least one uplink transmission channel of the terminal device and/or the resource information for transmission of the at least one uplink transmission channel are/is determined by measuring, by the first network device, a measured signal on a resource indicated by configuration information of the measured signal, and the measured signal is sent by the terminal device on the resource indicated by the configuration information of the measured signal.

Optionally, in some embodiments, the configuration information of the measured signal is determined by negotiation between the network device and the first network device.

Optionally, in some embodiments, the configuration information of the measured signal is determined by the network device according to information of a signal periodically sent by the terminal device, and the transmitting unit 1020 is further configured to:

send the configuration information of the measured signal to the first network device.

Optionally, in some embodiments, the configuration information of the measured signal includes at least one of:

information about a time-domain resource for sending the measured signal, information about a frequency-domain resource for sending the measured signal, information about a channel or signal resource for sending the measured signal and a manner for sending the measured signal.

Optionally, in some embodiments, the identification information of the beam corresponding to the at least one uplink transmission channel includes a beam identifier or serial number of the beam corresponding to the at least one uplink transmission channel.

The resource information for transmission of the at least one uplink transmission channel includes at least one of:

information about a time-domain resource for transmitting the at least one uplink transmission channel and information about a frequency-domain resource for transmitting the at least one uplink transmission channel.

Optionally, the first network device and the network device are the same network device.

For example, the first network device and the network device may be the same physical base station.

Optionally, in some embodiments, the first network device and the network device are different network devices.

For example, the first network device and the network device may be different physical base stations.

It is to be understood that the network device 1000 may correspond to a source cell in the method 700, which may realize corresponding functions of the source cell and will not be elaborated herein for simplicity.

Figure 11:
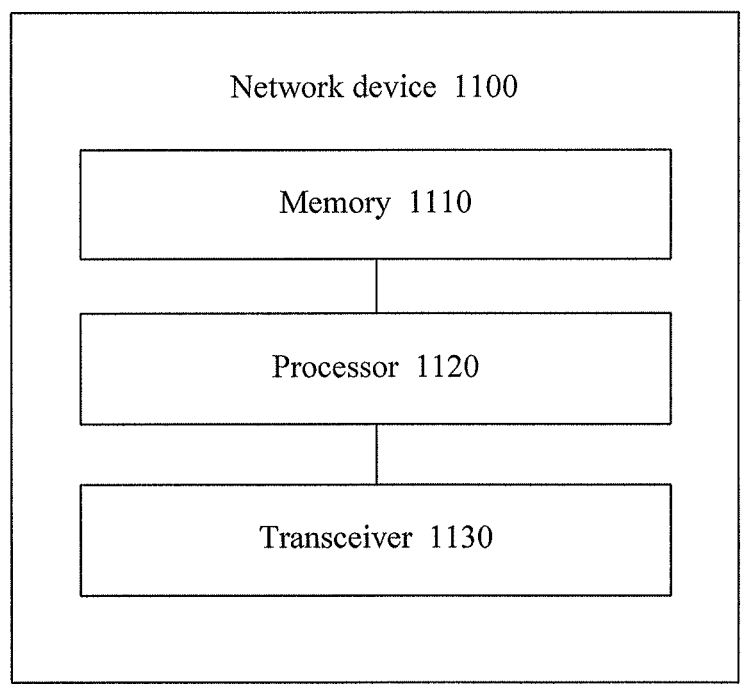
FIG. 11 is a schematic block diagram of a network device according to an embodiment of the application.

FIG. 11 is a schematic block diagram of a network device according to an embodiment of the application. As shown in FIG. 11, the network device 1100 includes a memory 1110, a processor 1120 and a transceiver 1130. The memory 1110 is configured to store a program. The processor 1120 is configured to execute the program. When the program is executed, the processor 1120 is configured to acquire configuration information of a measured signal, the configuration information of the measured signal being used for a terminal device to send the measured signal according to the configuration information of the measured signal, and determine a beam corresponding to at least one uplink transmission channel of the network device according to the measured signal sent by the terminal device. The transceiver 1130 is configured to transmit the at least one uplink transmission channel through the beam corresponding to the at least one uplink transmission channel of the network device, the network device being a network device to which a target cell belongs.

Optionally, in some embodiments, the processor 1120 is further configured to:

determine identification information of a beam corresponding to at least one uplink transmission channel of the terminal device and/or resource information for transmission of the at least one uplink transmission channel according to the measured signal sent by the terminal device.

The transceiver 1130 is further configured to:

send a first notification message to a first network device, the first notification message including the identification information of the beam corresponding to the at least one uplink transmission channel of the terminal device and/or the resource information for transmission of the at least one uplink transmission channel, which are/is determined by the network device, the first network device being a network device to which a source cell belongs.

Optionally, in some embodiments, the configuration information of the measured signal includes at least one of:

information about a time-domain resource for sending the measured signal, information about a frequency-domain resource for sending the measured signal, information about a channel or signal resource for sending the measured signal, and a manner for sending the measured signal.

Optionally, in some embodiments, the configuration information of the measured signal is determined by negotiation between the first network device and the network device.

Optionally, in some embodiments, the transceiver 1130 is further configured to:

receive the configuration information of the measured signal from the first network device, the configuration information of the measured signal being determined by the first network device according to information of a signal periodically sent by the terminal device.

Optionally, in some embodiments, the identification information of the beam corresponding to the at least one uplink transmission channel of the terminal device includes a beam identifier or serial number of the beam corresponding to the at least one uplink transmission channel of the terminal device.

The resource information for transmission of the at least one uplink transmission channel includes at least one of:

information about a time-domain resource for transmitting the at least one uplink transmission channel and information about a frequency-domain resource for transmitting the at least one uplink transmission channel.

Optionally, the first network device and the network device are the same network device.

For example, the first network device and the network device may be the same physical base station.

Optionally, in some embodiments, the first network device and the network device are different network devices.

For example, the first network device and the network device may be different physical base stations.

It is to be understood that the network device 1100 may correspond to a target cell in the method 500, which may realize corresponding functions of the target cell and will not be elaborated herein for simplicity.

Figure 12:
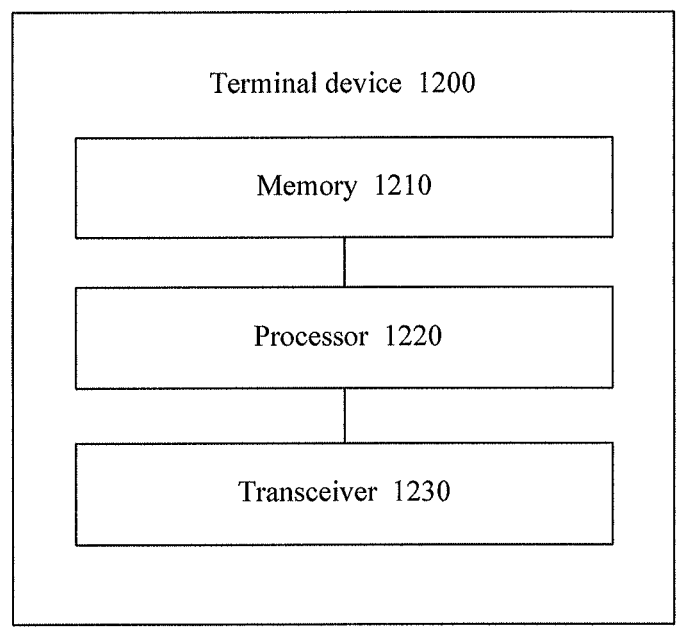
FIG. 12 is a schematic block diagram of a terminal device according to an embodiment of the application.

FIG. 12 is a schematic block diagram of a terminal device according to an embodiment of the application. As shown in FIG. 12, the terminal device 1200 includes: a memory 1210, a processor 1220 and a transceiver 1230.

The memory 1210 is configured to store a program. The processor 1220 is configured to execute the program. The processor 1220 may execute the program to control the transceiver 1230 to send a measured signal, the measured signal being used for a first network device to determine identification information of a beam corresponding to at least one uplink transmission channel of the terminal device and/or resource information for transmission of the at least one uplink transmission channel, the first network device being a network device to which a target cell belongs, and receive a notification message from a second network device, the notification message including the identification information of the beam corresponding to the at least one uplink transmission channel of the terminal device and/or the resource information for transmission of the at least one uplink transmission channel, which are/is determined by the second network device, and the second network device being a network device to which a source cell belongs.

Optionally, in some embodiments, the identification information of the beam corresponding to the at least one uplink transmission channel of the terminal device includes a beam identifier or serial number of the beam corresponding to the at least one uplink transmission channel of the terminal device.

The resource information for transmission of the at least one uplink transmission channel includes at least one of:

information about a time-domain resource for transmitting the at least one uplink transmission channel and information about a frequency-domain resource for transmitting the at least one uplink transmission channel.

Optionally, in some embodiments, the measured signal is a signal periodically sent by the terminal device.

Optionally, in some embodiments, the transceiver 1230 is further configured to:

receive configuration information of the measured signal from the second network device, the configuration information of the measured signal being determined by negotiation between the first network device and the second network device, and the configuration information of the measured signal being used for the terminal device to send the measured signal according to the configuration information of the measured signal.

Optionally, in some embodiments, the configuration information of the measured signal includes at least one of:

information about a time-domain resource for sending the measured signal, information about a frequency-domain resource for sending the measured signal, information about a channel or signal resource for sending the measured signal, and a manner for sending the measured signal.

Optionally, in some embodiments, the transceiver 1230 is further configured to:

send a random access signal on a resource indicated by the resource information for transmission of the at least one uplink transmission channel through the beam corresponding to the identification information, determined by the first network device, of the beam corresponding to the at least one uplink transmission channel of the terminal device to access the second network device.

Optionally, in some embodiments, the measured signal is further used for the first network device to determine a beam corresponding to at least one uplink transmission channel of the first network device.

Optionally, the first network device and the second network device are the same network device.

For example, the first network device and the second network device may be the same physical base station.

Optionally, in some embodiments, the first network device and the second network device are different network devices.

For example, the first network device and the second network device may be different physical base stations.

It is to be understood that the terminal device 1200 may correspond to a terminal device in the method 600, which may realize corresponding functions of the terminal device and will not be elaborated herein for simplicity.

Figure 13:
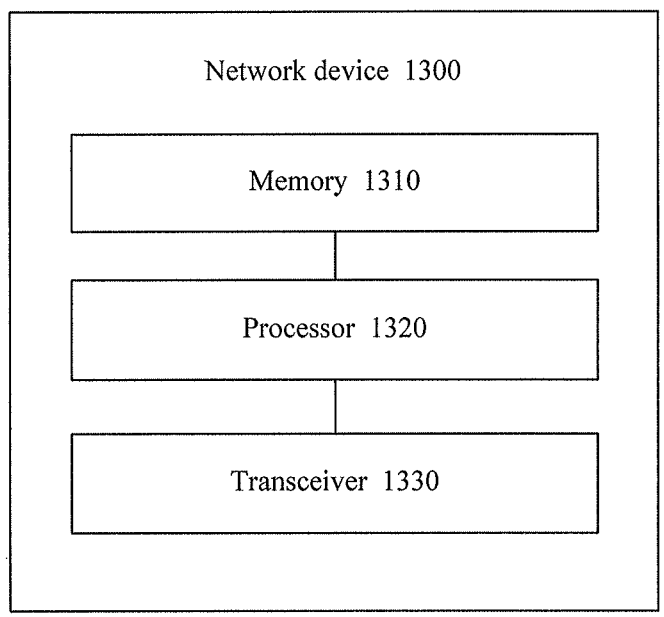
FIG. 13 is a schematic block diagram of a network device according to an embodiment of the application.

FIG. 13 is a schematic block diagram of a network device according to an embodiment of the application. As shown in FIG. 13, the network device 1300 includes a memory 1310, a processor 1320 and a transceiver 1330. The memory 1310 is configured to store a program. The processor 1320 is configured to execute the program. The processor 1320 may execute the program to control the transceiver 1330 to receive a first notification message from a first network device, the first notification message including identification information of a beam corresponding to at least one uplink transmission channel of a terminal device and/or resource information for transmission of the at least one uplink transmission channel, which are/is determined by the first network device, the network device being a network device to which a source cell belongs and the first network device being a network device to which a target cell belongs, and send a second notification message to the terminal device. The second notification message includes the identification information of the beam corresponding to the at least one uplink transmission channel of the terminal device and/or the resource information for transmission of the at least one uplink transmission channel, which are/is determined by the first network device.

Optionally, in some embodiments, the identification information of the beam corresponding to the at least one uplink transmission channel of the terminal device and/or resource information for transmission of the at least one uplink transmission channel are/is determined by measuring, by the first network device, a measured signal on a resource indicated by configuration information of the measured signal, and the measured signal is sent by the terminal device on the resource indicated by the configuration information of the measured signal.

Optionally, in some embodiments, the configuration information of the measured signal is determined by negotiation between the network device and the first network device.

Optionally, in some embodiments, the configuration information of the measured signal is determined by the network device according to information of a signal periodically sent by the terminal device, and the transceiver 1330 is further configured to:

send the configuration information of the measured signal to the first network device.

Optionally, in some embodiments, the configuration information of the measured signal includes at least one of:

information about a time-domain resource for sending the measured signal, information about a frequency-domain resource for sending the measured signal, information about a channel or signal resource for sending the measured signal, and a manner for sending the measured signal.

Optionally, in some embodiments, the identification information of the beam corresponding to the at least one uplink transmission channel includes a beam identifier or number of the beam corresponding to the at least one uplink transmission channel.

The resource information for transmission of the at least one uplink transmission channel includes at least one of:

information about a time-domain resource for transmitting the at least one uplink transmission channel and information about a frequency-domain resource for transmitting the at least one uplink transmission channel.

Optionally, the first network device and the network device are the same network device.

For example, the first network device and the network device may be the same physical base station.

Optionally, in some embodiments, the first network device and the network device are different network devices.

For example, the first network device and the network device may be different physical base stations.

It is to be understood that the network device 1300 may correspond to a source cell in the method 700, which may realize corresponding functions of the source cell and will not be elaborated herein for simplicity.

It is to be understood that the term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that former and latter associated objects form an "or" relationship.

It is to be understood that, in various embodiments of the application, a magnitude of a sequence number of each process does not mean an execution sequence and the execution sequence of each process should be determined by its function and an internal logic, and should not form any limit to an implementation process of the embodiments of the application.

Those of ordinary skill in the art may realize that the units and algorithm steps of each example described in combination with the embodiments disclosed in the disclosure may be implemented by electronic hardware or a combination of computer software and the electronic hardware. Whether these functions are executed by hardware or software depends on specific applications and design constraints of the technical solutions. Professionals may realize the described functions for each specific application through different methods, but such realization shall fall within the scope of the application.

Those skilled in the art may clearly learn about that specific working processes of the system, devices and units described above may refer to the corresponding processes in the method embodiment and will not be elaborated herein for convenient and brief description.

In some embodiments provided by the application, it is to be understood that the disclosed system, devices and methods may be implemented in other manners. For example, the device embodiments described above are only schematic, and for example, division of the units is only logic function division, and other division manners may be adopted during practical implementation. For example, multiple units or components may be combined or integrated into a system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, namely, may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. An information transmission method, comprising:
  sending, by a terminal device, a measured signal, wherein the measured signal is used for a target cell to determine resource information for transmission of at least one uplink transmission channel; and
  receiving, by the terminal device, a notification message from a source cell, wherein the notification message comprises the resource information for transmission of the at least one uplink transmission channel; and sending, by the terminal device, a random access signal on a resource indicated by the resource information for transmission of the at least one uplink transmission channel through a beam corresponding to identification information, determined by the target cell, of a beam corresponding to the at least one uplink transmission channel of the terminal device to access the target cell, wherein the measured signal is further configured for the target cell to determine the identification information of the beam corresponding to the at least one uplink transmission channel of the terminal device;

the notification message further comprises the identification information of the beam corresponding to the at least one uplink transmission channel of the terminal device;

the identification information of the beam corresponding to the at least one uplink transmission channel of the terminal device comprises a beam identifier or serial number of the beam corresponding to the at least one uplink transmission channel of the terminal device; and the resource information for transmission of the at least one uplink transmission channel comprises at least one of:

information about a time-domain resource, or information about a frequency-domain resource for transmitting the at least one uplink transmission channel of the terminal device.

2. The method of claim 1, wherein the measured signal is a signal periodically sent by the terminal device.

3. The method of claim 1, further comprising:

receiving, by the terminal device, configuration information of the measured signal from the source cell, wherein the configuration information of the measured signal is determined by negotiation between the source cell and the target cell and is used for the terminal device to send the measured signal according to the configuration information of the measured signal.

4. The method of claim 3, wherein the configuration information of the measured signal comprises at least one of:

information about a time-domain resource for sending the measured signal, information about a frequency-domain resource for sending the measured signal, information about a channel or signal resource for sending the measured signal, or, a manner for sending the measured signal.

5. A terminal device, comprising a transceiver configured to:

send a measured signal, wherein the measured signal is configured for a target cell to determine resource information for transmission of at least one uplink transmission channel, and receive a notification message from a source cell, wherein the notification message comprises the resource information for transmission of the at least one uplink transmission channel, wherein the terminal device sends a random access signal on a resource indicated by the resource information for transmission of the at least one uplink transmission channel through a beam corresponding to identification information, determined by the target cell, of a beam corresponding to the at least one uplink transmission channel of the terminal device to access the target cell, wherein the measured signmal is further configured for the target cell to determine the identification information of the beam corresponding to the at least one uplink transmission channel of the terminal device, the notification message further comprises the identification information of the beam corresponding to the at least one uplink transmission channel of the terminal device, the identification information of the beam corresponding to the at least one uplink transmission channel of the terminal device comprises a beam identifier or serial number of the beam corresponding to the at least one uplink transmission channel of the terminal device; and the resource information for transmission of the at least one uplink transmission channel comprises at least one of:

information about a time-domain resource, or information about a frequency-domain resource for transmitting the at least one uplink transmission channel.

6. The terminal device of claim 5, wherein the measured signal is a signal periodically sent by the terminal device.

7. The terminal device of claim 5, wherein the transceiver is further configured to:

receive configuration information of the measured signal from the source cell, wherein the configuration information of the measured signal is determined by negotiation between the target cell and the source cell, and the configuration information of the measured signal is used for the terminal device to send the measured signal according to the configuration information of the measured signal.

8. The terminal device of claim 7, wherein the configuration information of the measured signal comprises at least one of:

information about a time-domain resource for sending the measured signal, information about a frequency-domain resource for sending the measured signal, information about a channel or signal resource for sending the measured signal, or, a manner for sending the measured signal.

9. The terminal device of claim 5, wherein the measured signal is further configured for the target cell to determine a beam corresponding to at least one uplink transmission channel of the target cell.

* * * * *